(12) United States Patent
Smith et al.

(10) Patent No.: US 6,227,975 B1
(45) Date of Patent: May 8, 2001

(54) LOCKING COVER FOR A LUBRICATION FITTING MOUNTED ON A UNIVERSAL JOINT CROSS

(75) Inventors: Johnny N. Smith; Jeffrey A. Dutkiewicz, both of Toledo, OH (US); Damien Gremillard, Lyons (FR)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/386,243

(22) Filed: Aug. 31, 1999

(51) Int. Cl.$^7$ ........................................... F16C 1/24
(52) U.S. Cl. ........................ 464/14; 464/7; 184/105.3
(58) Field of Search .................. 464/11, 12, 13, 464/14, 23, 7, 10, 15, 16; 184/88.1, 105.3, 88.2, 90; 137/383; 220/837; 215/224, 263

(56) References Cited

U.S. PATENT DOCUMENTS

| | | | |
|---|---|---|---|
| 1,333,412 | * | 3/1920 | Gullborg ........................ 184/105.3 X |
| 3,147,824 | | 9/1964 | Henderson . |
| 3,318,362 | | 5/1967 | Joyce, III . |
| 4,047,396 | * | 9/1977 | McElwain et al. ..................... 464/14 |
| 4,127,221 | * | 11/1978 | Vere ................................. 215/224 X |
| 4,244,495 | * | 1/1981 | Lorscheid et al. ................ 215/224 X |
| 4,254,888 | | 3/1981 | Chandler . |
| 4,377,245 | | 3/1983 | Patty . |
| 4,453,618 | | 6/1984 | Economaki . |
| 4,874,349 | * | 10/1989 | Gall ........................................ 464/14 |
| 5,389,039 | * | 2/1995 | Mazziotti ............................... 464/14 |
| 5,660,589 | * | 8/1997 | Smith .................................... 464/14 |
| 5,718,633 | * | 2/1998 | Gehrke .................................. 464/23 |

* cited by examiner

Primary Examiner—Lynne H. Browne
Assistant Examiner—Greg Binda
(74) Attorney, Agent, or Firm—MacMillan, Sobanski & Todd, LLC

(57) ABSTRACT

A locking cover is designed to protectively enclose a lubricant fitting mounted on a cross of a universal joint and cannot be removed after installation without damaging or destroying the locking cover. The locking cover includes a first half and a second half that are joined together by a hinge. Each half includes a generally U-shaped body portion defined by a central web and a pair of opposed leg portions. The first leg has an outwardly extending tang formed thereon having an outwardly extending barb. The second leg has an opening formed therein that terminates in a shoulder. A cover panel extends between the first and second legs defining a partial cavity therebetween. A pair of posts are provided on the cover panel and extend inwardly into the partial cavity defined by the first and second legs and the cover panel. When the locking cover is closed about the lubrication fitting, the tangs are received within the openings such that the barbs engage the associated shoulders. As a result, the two halves are locked together about the lubricant fitting. The posts are sized and positioned to engage portions of the lubricant fitting to support the locking cover thereon. Once the two halves are enclosed about the lubricant fitting, the locking cover cannot be subsequently removed without damaging or destroying the locking cover. This feature prevents service personnel from readily gaining access to the lubricant fitting to lubricate the cross at premature intervals.

11 Claims, 3 Drawing Sheets

LOCKING COVER FOR A LUBRICATION FITTING MOUNTED ON A UNIVERSAL JOINT CROSS

BACKGROUND OF THE INVENTION

This invention relates in general to universal joint assemblies for vehicular drive train systems. In particular, this invention relates to a locking cover for protectively covering a lubrication fitting mounted on a cross of a universal joint assembly.

Universal joint assemblies are well known devices that provide a driving connection between two members adapted to rotate about non-aligned axes of rotation. Universal joint assemblies are widely used between rotatable drive shaft sections in vehicle drive train systems. A typical universal joint assembly includes a cross having a central body portion with four cylindrical trunnions extending outwardly from the cross. The trunnions are oriented in a single plane and extend at right angles relative to one another, and the trunnions have a common intersection at the center of the central body portion. A hollow cylindrical bearing cup is mounted on the end of each of the trunnions. Needle bearings or similar means are provided between the outer cylindrical surfaces of the trunnions and the inner cylindrical surfaces of the bearing cups to permit relative rotational movement between the trunnions and the bearing cups. The bearing cups that are mounted on an opposed pair of the trunnions can be connected to a first end yoke secured to an end of a first drive shaft section, while the bearing cups that are mounted on a second opposed pair of the trunnions can be connected to a second end yoke secured to an end of a second drive shaft section.

It is usually necessary to periodically provide lubrication for the bearings between the bearing cups and the trunnions in a universal joint assembly. To accomplish this, the central body portion of the cross has a cavity formed therein that communicates with respective lubricant passageways formed through each of the trunnions. A lubrication fitting is mounted in an aperture formed through the central body portion of the cross. The lubrication fitting is a check valve that allows lubricant to be injected under pressure into the cavity, while preventing such lubricant from leaking outwardly therefrom. During this injection, the lubricant flows through the lubrication fitting into the cavity, radially outwardly from the cavity through each of the lubricant passageways, around the ends of the trunnions, and radially inwardly into the region of the bearings. A seal and dust guard assembly may be provided about the open end of each of the bearing cups to retain the lubricant in the region of the bearings and to prevent the entry of dirt, water, and other contaminants therein.

In the past, conventional universal joint assemblies have been designed such that the above-described lubrication process can be performed at relatively frequent intervals. To accomplish this, the seal and dust guard assemblies have been structured in such a manner as to allow excess lubricant to flow therethrough from the region of the bearings to the exterior of the bearing cup. Consequently, the above-described lubrication process can be performed as often as desired without causing any damage to the seal and dust guard assemblies. More recently, however, universal joint assemblies have been structured such that the above-described lubrication process should be performed only at relatively long time intervals, if at all. In these more recent universal joint assemblies, the seal and dust guard assemblies are not designed to allow lubricant to flow therethrough in either direction. However, it has been found that in some instances, service personnel occasionally have difficulty determining whether a particular universal joint assembly being serviced is of the older type (that does requires relatively frequent lubrication) or of the newer type (that does not require relatively frequent lubrication). As a result, such service personnel occasionally attempt to inject lubricant into a newer type of universal joint assembly, which can possibly yield undesirable results. Thus, it would be desirable to provide a simple and inexpensive mechanism for clearly identifying the newer types of universal joint assemblies and for positively deterring the injection of lubricant therein.

SUMMARY OF THE INVENTION

This invention relates to a locking cover that is designed to protectively enclose a lubricant fitting mounted on a cross of a universal joint and which cannot be removed after installation without damaging or destroying the locking cover. The locking cover includes a first half and a second half that are joined together by a hinge. Each half includes a generally U-shaped body portion defined by a central web and a pair of opposed leg portions. The first leg has an outwardly extending tang formed thereon having an outwardly extending barb. The second leg has an opening formed therein that terminates in a shoulder. A cover panel extends between the first and second legs defining a partial cavity therebetween. A pair of posts are provided on the cover panel and extend inwardly into the partial cavity defined by the first and second legs and the cover panel. When the locking cover is closed about the lubrication fitting, the tangs are received within the openings such that the barbs engage the associated shoulders. As a result, the two halves are locked together about the lubricant fitting. The posts are sized and positioned to engage portions of the lubricant fitting to support the locking cover thereon. Once the two halves are enclosed about the lubricant fitting, the locking cover cannot be subsequently removed without damaging or destroying the locking cover. This feature prevents service personnel from readily gaining access to the lubricant fitting to lubricate the cross at premature intervals.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
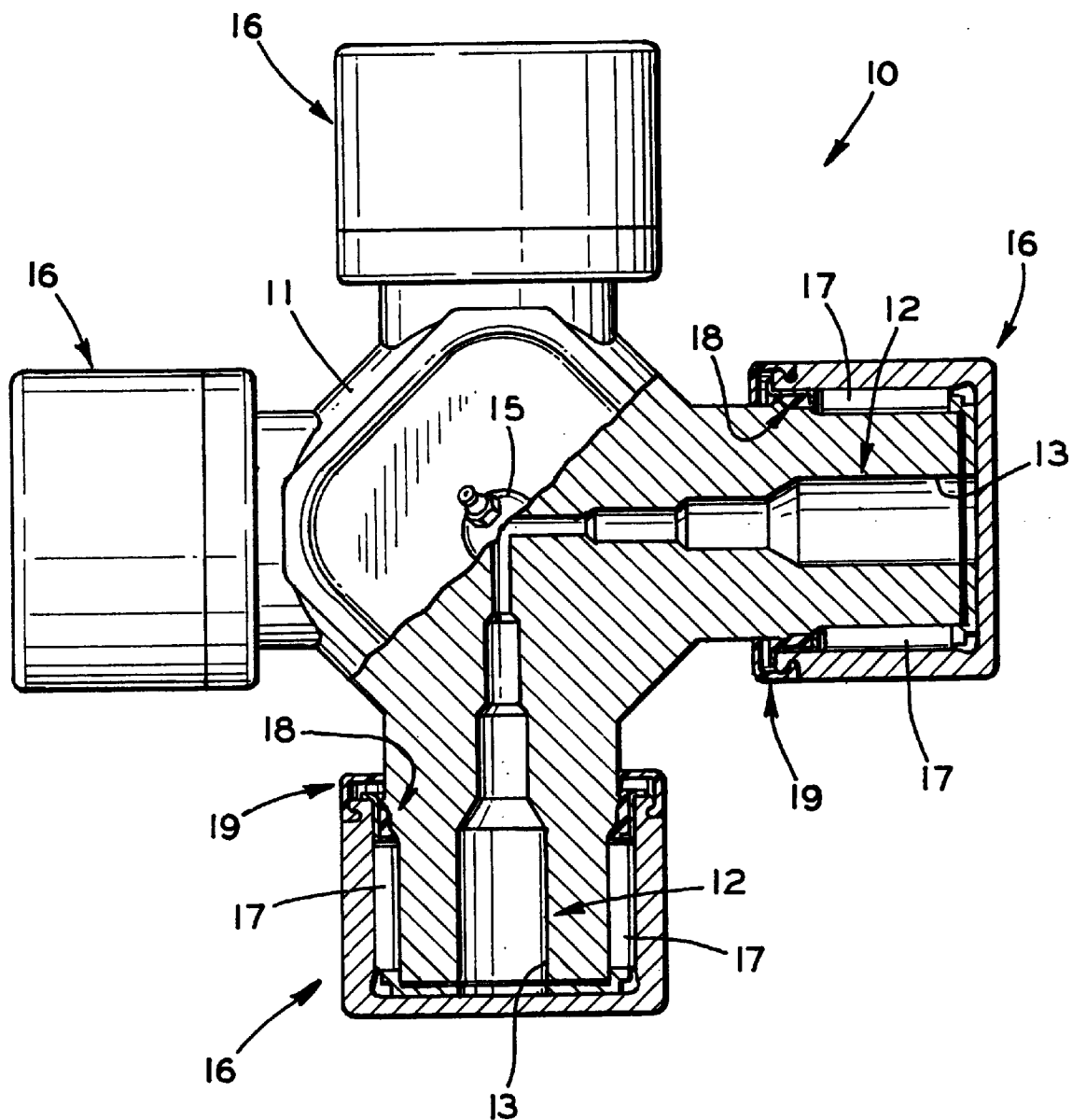
FIG. 1 is an elevational view, partially in cross section, of a prior art cross for a universal joint having a lubrication fitting mounted thereon.

Referring now to the drawings, there is illustrated in FIG. 1 a cross, indicated generally at 10, that is conventional in the art. The cross 10 is adapted to form a portion of a conventional universal joint (not shown). The cross 10 includes a central body portion 11 having a plurality of trunnions, indicated generally at 12, extending outwardly from the body portion 11. In the illustrated embodiment, four of such trunnions 12 are formed integrally with the body portion 11. The trunnions 12 are disposed at right angles relative to one another and are oriented so as to lie in a single plane. The trunnions 12 are generally hollow and cylindrical in shape and define respective axes through the trunnions 12. Each of the trunnions 12 terminates in a cylindrical outer cylindrical bearing surface.

Figure 2:
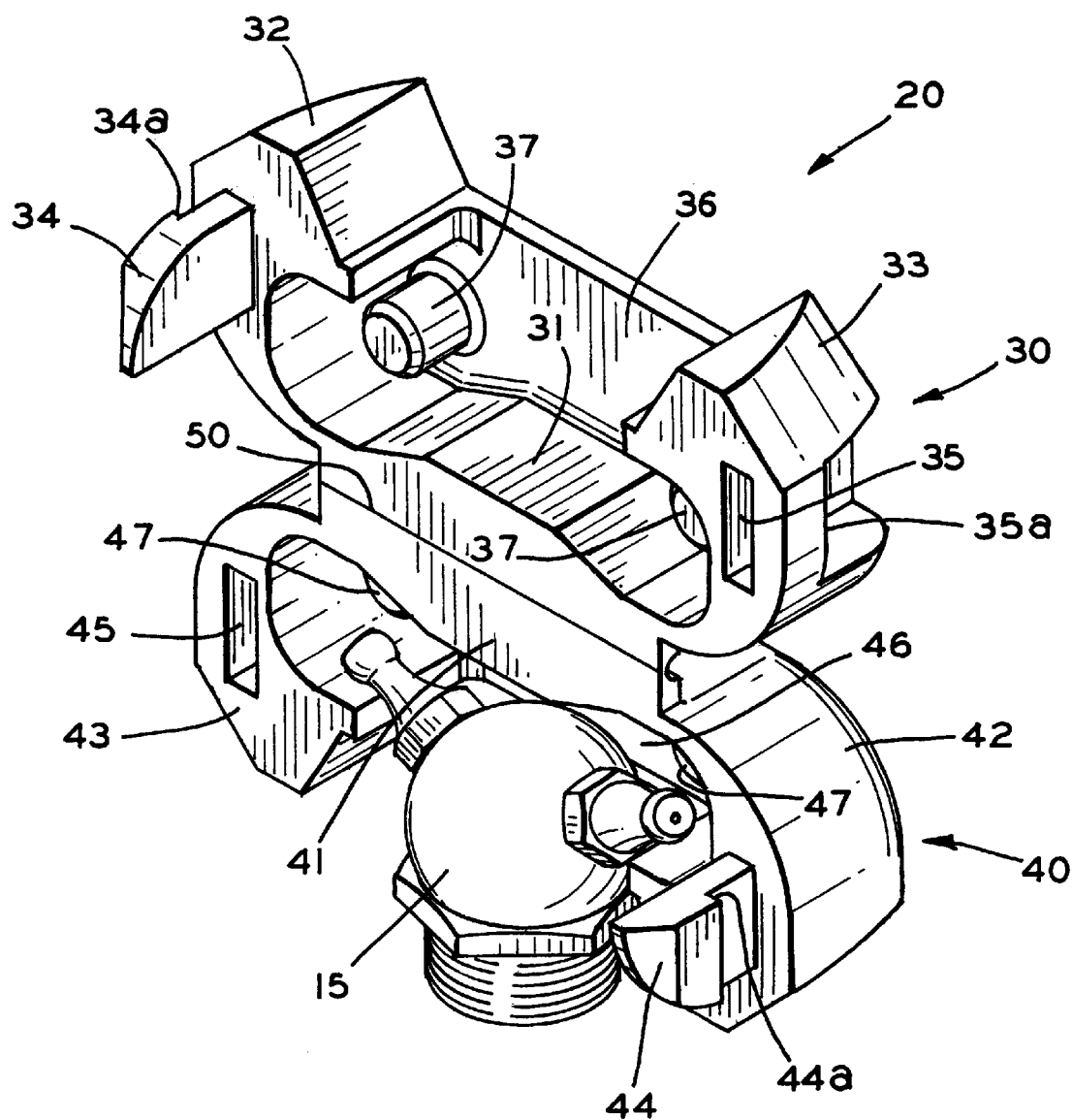
FIG. 2 is a front side perspective view of the lubrication fitting illustrated in FIG. 1 having a locking cover in accordance with this invention positioned adjacent thereto in an opened position.

An internal lubricant passageway 13 extends from a central internal cavity formed in the body portion 11 radially outwardly through each of the trunnions 12 to the axially outermost ends thereof. A lubricant fitting 15 is mounted on the body portion 11 of the cross 10 and communicates with each of the lubricant passageways 13. The lubricant fitting 15 is conventional in the art and is shaped to cooperate with a conventional lubricating mechanism (not shown) to inject lubricant into each of the lubricant passageways 13. The lubricant fitting 15 may be formed having a single head or a plurality of heads (as shown in FIG. 2) to facilitate the use of the lubricating mechanism. Typically, the lubricant fitting 15 includes an internal check valve (not shown) that permits the one-way flow of lubricant into the body portion 11 of the cross 10, but prevents lubricant within the body portion 11 from leaking out in the reverse direction.

A bearing cup, indicated generally at 16, is mounted about each of the trunnions 12 of the cross 10. Each of the bearing cups 16 is generally hollow and cylindrical in shape, including a closed end, an open end, and a smooth inner cylindrical bearing surface. When mounted about the trunnion 12, the closed end of the bearing cup 16 is disposed adjacent to the axially outermost end thereof, while the inner bearing surface of the bearing cup 16 is disposed concentrically about the outer cylindrical bearing surface of the trunnion 12. The diameter defined by the inner bearing surface of the bearing cup 16 is somewhat larger than the diameter defined by the outer bearing surface of the trunnion 12, thus defining an annular space therebetween. A plurality of conventional roller bearings 17 (only two are illustrated) is disposed in the annular space in a circumferential array about each of the trunnions 12. The roller bearings 17 have axially outer ends located adjacent to the closed end of the bearing cup 16 and axially inner ends located adjacent to the open end of the bearing cup 16. As is well known, the roller bearings 17 are provided to facilitate rotational movement of the bearing cup 16 relative to the trunnion 12.

An annular seal, indicated generally at 18, is provided about the open end of each of the bearing cups 20. The annular seal 18 is conventional in the art and can include a metallic support ring and an elastomeric seal having a plurality of sealing lips that extend radially inwardly into engagement with the trunnion 12. The annular seal 18 is provided to prevent lubricant from flowing radially inwardly away from the region of the needle bearings 17. An annular dust guard, indicated generally at 19, can be removably secured about the open end of each of the bearing cups 20. The illustrated dust guard 19 is generally L-shaped in cross section (although such is not required) defined by an axially extending outer portion and a radially extending inner portion. The dust guard 19 is provided to prevent dirt and other contaminant from entering into the region of the annular seal 18.

Figure 3:
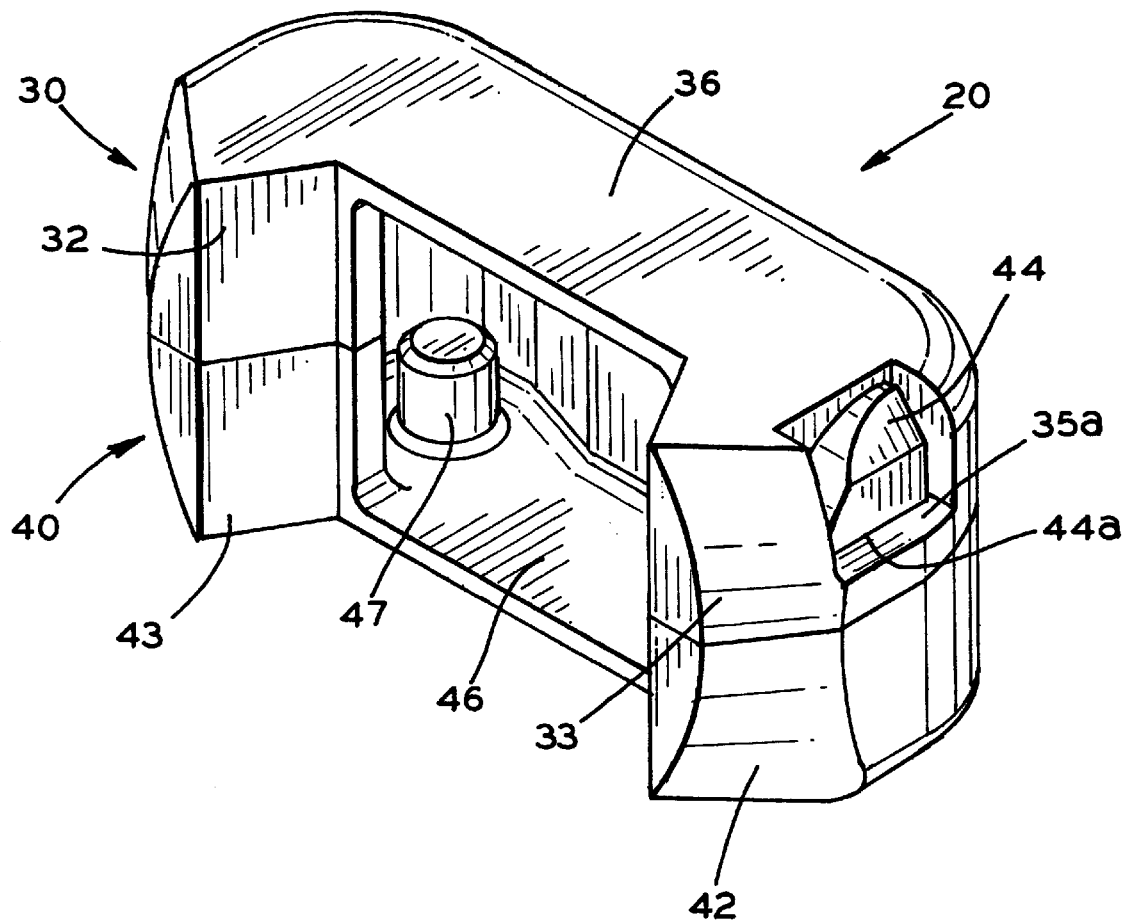
FIG. 3 is a front side perspective view similar to FIG. 2 showing the locking cover in a closed position, wherein the lubrication fitting has been removed for clarity.

Referring now to FIGS. 2 and 3, there is illustrated a locking cover, indicated generally at 20, in accordance with this invention for protectively covering the lubricant fitting 15. As shown therein, the locking cover 20 includes a first half, indicated generally at 30, and a second half, indicated generally at 40, that are joined together by a hinge 50. The first half 30 includes a generally U-shaped body portion defined by a central web 31 and a pair of opposed leg portions 32 and 33. The first leg 32 has an outwardly extending tang 34 formed thereon including an outwardly extending barb 34a. The second leg 33 has an inwardly extending opening 35 formed therein that terminates in an outwardly extending shoulder 35a. A cover panel 36 extends between the first and second legs 31 and 32 defining a partial cavity therebetween. A pair of posts 37 are provided on the cover panel 36 and extend inwardly into the partial cavity defined by the first and second legs 31 and 32 and the cover panel 36. The second half 40 of the locking cover 20 is formed in a similar manner, including a generally U-shaped body portion defined by a central web 41 and a pair of opposed leg portions 42 and 43. The first leg 42 has an outwardly extending tang 44 formed thereon including an outwardly extending barb 44a. The second leg 43 has an inwardly extending opening 45 formed therein that terminates in an outwardly extending shoulder (not shown). A cover panel 46 extends between the first and second legs 41 and 42 defining a partial cavity therebetween. A pair of posts 47 are provided on the cover panel 46 and extend inwardly into the partial cavity defined by the first and second legs 41 and 42 and the cover panel 46.

The locking cover 20 can be moved from the opened position illustrated in FIG. 2 to a closed position illustrated in FIG. 3 so as to protective cover the lubricant fitting 15. This can be accomplished by pivoting the first and second halves 30 and 40 about the hinge 50 such that the tang 34 provided on the first leg 32 of the first half 30 is received within the opening 45 formed in the second leg 43 of the second half 40, and such that the tang 44 provided on the first leg 42 of the second half 40 is received within the opening 35 formed in the second leg 33 of the first half 30. When this occurs, the barb 34a formed on the tang 34 engages the shoulder (not shown) formed at the end of the opening 45, and the barb 44a formed on the tang 44 engages the shoulder 35a formed at the end of the opening 35. As a result, the two halves 30 and 40 are locked together about the lubricant fitting 15, which is received within the interior space of the locking cover 20 defined by the two partial cavities discussed above. This interior space is preferably formed having approximately the same shape as the lubricant fitting 15 so as to prevent the locking cover 20 from moving significantly relative thereto. Preferably, the four posts 37 and 47 are sized and positioned to engage portions of the lubricant fitting 15 to support the locking cover 20 thereon. The locking cover 20 may be formed having additional seals (not shown) or other structures to prevent dirt, water, and other contaminants from reaching the lubricant fitting 15.

An important feature of this invention is that once the two halves 30 and 40 are moved to the closed position illustrated in FIG. 3 about the lubricant fitting 15, they cannot be subsequently returned to the opened position illustrated in FIG. 2 without damaging or destroying the locking cover 20. This feature prevents service personnel from readily gaining access to the lubricant fitting 15. As discussed above, the seal 18 prevents lubricant from flowing radially inwardly away from the region of the needle bearings 17. Thus, once the cross 10 has been assembled and lubricated, further lubrication of the cross 10 is unnecessary and undesirable, at least for an extended period of time. By preventing service personnel from readily gaining access to the lubricant fitting 15, the locking cover 20 functions not only to protectively cover such lubricant fitting 15, but further protects the seal 18 from undesirable premature lubrication. When service personnel encounter the locking cover 20 about the lubricant fitting 15, they will be reminded not to lubricant the cross 10 without first checking a service manual to determine whether it is appropriate.

The locking feature of the locking cover 20 can be accomplished in any desired manner. In the illustrated embodiment, the barbed tangs 34 and 44 are provided to secure the two halves 30 and 40 together as described above. The tangs 34 and 44 may, for example, be formed having a thickness that is slightly larger than the width of the associated openings 35 and 45. As a result, the openings 35 and 45 are expanded slightly when the tangs 34 and 44 are inserted therethrough. Once the tangs 34 and 44 are inserted through the openings 35 and 45, the barbs 34a and 44a prevent the withdrawal thereof without damaging or destroying the openings 35 and 45 or other portions of the locking cover 20. However, any structure may be provided for preventing the removal of the locking cover 20 without causing damage thereto.

The lockable cover 10 is preferably formed form a single piece of a lightweight, durable material, such as injection molded plastic. However, the locking cover 20 may be formed from any desired material. Preferably, the hinge 50 is formed by decreasing the thickness of the portion of the locking cover 20 extending between the first and second halves 30 and 40. Such a hinge structure allows the first and second halves 30 and 40 to pivot relative to one another such that the locking cover 20 can be quickly and easily positioned and installed on the lubricant fitting 15 in the manner described above. Alternatively, the first and second halves 30 and 40 may be formed from separate pieces having no hinge 50 if desired. The locking cover 10 may be installed on the lubricant fitting 15 after the cross 10 has been assembled with the other components of the universal joint and the entire driveshaft assembly (not shown).

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A cross for a universal joint comprising:
 a body portion having a plurality of trunnions extending outwardly therefrom, each of said trunnions having a lubricant passageway formed therein;
 a bearing cup disposed about each of said trunnions;
 bearings disposed between each of said trunnions and said bearing cups disposed thereabout;
 a lubricant fitting mounted on said body portion and communicating with said lubricant passageways; and
 a cover provided about said lubricant fitting so as to prevent access thereto, said cover being locked to prevent the removal thereof to gain access to said lubricant fitting without damaging said cover.

2. The cross defined in claim 1 wherein said cover includes first and second halves that are secured together about said lubricant fitting.

3. The cross defined in claim 2 wherein said first half has a tang formed thereon and said second half has an opening formed therein, said tang being inserted through said opening to secure said first and second halves together.

4. The cross defined in claim 2 wherein said first half has a tang formed thereon and an opening formed therein and wherein said second half has a tang formed thereon and an opening formed therein, said tang of said first half being inserted through said opening of said second half and said tang of said second half being inserted through said opening of said first half to secure said first and second halves together.

5. The cross defined in claim 1 wherein said cover has a plurality of posts formed thereon that engage said lubricant fitting.

6. The cross defined in claim 1 wherein said cover includes a generally U-shaped body portion defined by a central web and a pair of opposed leg portions.

7. The cross defined in claim 1 wherein said cover includes first and second halves that are connected together by a hinge and are secured together about said lubricant fitting.

8. The cross defined in claim 7 wherein said first half has a tang formed thereon and said second half has an opening formed therein, said tang being inserted through said opening to secure said first and second halves together.

9. The cross defined in claim 7 wherein said first half has a tang formed thereon and an opening formed therein and said second half has a tang formed thereon and an opening formed therein, said tang of said first half being inserted through said opening of said second half and said tang of said second half being inserted through said opening of said first half to secure said first and second halves together.

10. The cross defined in claim 7 wherein said cover has a plurality of posts formed thereon that engage said lubricant fitting.

11. The cross defined in claim 7 wherein said cover includes a generally U-shaped body portion defined by a central web and a pair of opposed leg portions.

* * * * *